United States Patent
Cheng

(10) Patent No.: US 7,004,453 B1
(45) Date of Patent: Feb. 28, 2006

(54) PENDULUM VALVE WITH A FULL RANGE OF POSITION CONTROL

(75) Inventor: Shiyuan (Denny) Cheng, Richardson, TX (US)

(73) Assignee: Mykrolis Corporation, Billerica, MA (US)

( * ) Notice: Subject to any disclaimer, the term of this patent is extended or adjusted under 35 U.S.C. 154(b) by 0 days.

(21) Appl. No.: 09/952,083

(22) Filed: Sep. 12, 2001

Related U.S. Application Data

(60) Provisional application No. 60/286,790, filed on Apr. 25, 2001.

(51) Int. Cl.
*F16K 3/18* (2006.01)

(52) U.S. Cl. ........................... 251/211; 251/167
(58) Field of Classification Search ........... 251/129.15, 251/158, 161, 205, 206, 208, 298, 301, 302, 251/229, 167, 193, 195, 84, 87, 88, 160, 251/169, 176, 177, 178, 180, 187, 188, 192, 251/196, 211; 137/614.13, 614.14, 637.3, 137/637.5, 613, 637, 637.2, 637.4
See application file for complete search history.

(56) References Cited

U.S. PATENT DOCUMENTS

| | | | | |
|---|---|---|---|---|
| 241,568 | A | | 5/1881 | Spratt |
| 2,510,356 | A | * | 6/1950 | Werts ................... 251/206 X |
| 2,850,260 | A | | 9/1958 | Perazone et al. ........... 251/169 |
| 3,525,350 | A | * | 8/1970 | Hosek ........................ 251/211 |
| 3,557,822 | A | | 1/1971 | Chronister .................. 137/315 |
| 3,606,980 | A | | 9/1971 | Simpson et al. |
| 3,633,626 | A | * | 1/1972 | Zirps et al. ............... 137/637.3 |
| 3,722,857 | A | | 3/1973 | Townsend .................... 251/203 |
| 3,973,753 | A | | 8/1976 | Wheeler ..................... 251/204 |
| 4,052,036 | A | | 10/1977 | Schertler .................... 251/144 |
| 4,089,505 | A | | 5/1978 | Anderle et al. ............. 251/133 |
| 4,333,631 | A | | 6/1982 | Bösch ........................ 251/159 |
| 4,627,567 | A | | 12/1986 | Thorn ....................... 236/34.5 |
| 4,785,844 | A | | 11/1988 | Pankov ...................... 137/242 |
| 4,962,912 | A | * | 10/1990 | Stoll ......................... 251/208 |
| 5,236,003 | A | * | 8/1993 | Habicht ...................... 251/306 |
| 5,566,922 | A | * | 10/1996 | Tanaka et al. ............. 251/193 |
| 5,577,707 | A | | 11/1996 | Brida ......................... 251/159 |
| 5,709,369 | A | * | 1/1998 | Hawkins et al. .............. 251/86 |
| 5,842,680 | A | * | 12/1998 | Bustamante et al. ..... 251/208 X |
| 5,873,562 | A | | 2/1999 | Marugg ...................... 251/301 |
| 6,089,537 | A | | 7/2000 | Olmsted ................. 251/129.11 |
| 6,161,576 | A | | 12/2000 | Maher et al. .......... 137/565.23 |

FOREIGN PATENT DOCUMENTS

| | | |
|---|---|---|
| EP | 1190755 | 6/1961 |
| EP | 1050435 | 12/1966 |

OTHER PUBLICATIONS

International Search Report dated Jul. 15, 2002.

* cited by examiner

*Primary Examiner*—Eric Keasel
(74) *Attorney, Agent, or Firm*—Sprinkle IP Law Group

(57) ABSTRACT

Embodiments of the present invention provide a pendulum valve with a full range of normal position control. The pendulum valve can include a valve housing having a flow channel, and a valve body that is movable within the valve housing between a fully open position and at least one closed position. The pendulum valve can also include an electrical control mechanism operable to position the valve body in any one of a range of partially open positions.

21 Claims, 3 Drawing Sheets

PENDULUM VALVE WITH A FULL RANGE OF POSITION CONTROL

RELATED INFORMATION

This application claims priority under 35 U.S.C. § 119(e) to provisional patent application No. 60/286,790 entitled "Pendulum Valve with Accurate Control In Throttling and Thrusting," filed Apr. 25, 2001, which is hereby fully incorporated by reference.

TECHNICAL FIELD OF THE INVENTION

The present invention relates generally to pendulum valves and more particularly to a pendulum valve with a full range of normal position control to allow for a continuous range of partially open positions.

BACKGROUND OF THE INVENTION

In semiconductor manufacturing, as the size of silicon wafers increases and the size of semiconductor devices decreases, there is an ever greater need for the application of uniform thin films to the silicon wafers. However, the uniformity of a thin film is strongly dependent upon precise pressure control of the gases within the semiconductor manufacturing equipment.

Pendulum valves have been used in high-purity gas delivery systems required for semiconductor manufacturing and other thin film coating processes. Pendulum valves are often used to control the pressure in high-vacuum chambers (e.g., a pressure on the order of one torr or less) and are typically located between the vacuum chamber and a turbo pump. In pendulum valve 100, a valve body can typically move from a fully closed position to a fully open position. This generally involves rotating the valve body from the open position to a position that is aligned with the gas flow channel through the valve and then linearly moving the valve body to the fully closed position, thus sealing the valve.

Prior art pendulum valves typically use a step motor to provide rotational movement to the valve body and pneumatics to provide linear movement to the valve body. However, these prior art systems are limited because pneumatics do not provide for accurate linear positioning, and in systems using pneumatics, the valve body can usually be linearly positioned only in the fully closed position (e.g., in the sealed position) or in one partially open position ready for rotation. However, the valve body cannot be positioned over a range of continuous partially open positions to control the throttling of gas through the flow channel.

To compensate for the lack of throttling with pneumatics, one prior art valve employs a secondary valve. When the valve body of this prior art valve is in the fully closed position, fine pressure adjustments are done by opening and closing the smaller secondary port (e.g., the secondary valve). This system, however, is limited because it requires an extra valve and more valve controls to perform throttling functions. Additionally, because of the extra valves, this prior art system is difficult to manufacture, service and maintain, causing valuable chip fabrication equipment to be shut down for hours while this type of pendulum valve is serviced or maintained.

In another prior art system, the pneumatic pressure control is refined so that the valve body can be positioned in a sealed position, a center partially open position, and a partially open position. However, even with two partially open positions, these valves do not provide sufficient throttling of gas flow for thin film coating processes that require accurate and uniform control of the thin film deposition. Additionally, the pneumatics of these pendulum valves make the pendulum valves difficult to manufacture, service and maintain, again leading to hours of down time when the pendulum valve needs service or cleaning.

Another disadvantage of prior art systems is that, over time, the pressures experienced by the pendulum valve tend to bend the valve body. Because the valve body is bent, the valve body may not form a tight seal even when the valve body is moved to the fully closed position, leading to significant leakage and a general degrading of the integrity of the vacuum in the vacuum chamber. Thus, the ability of the prior art pendulum valves to create an adequate seal decreases over time as the valve bodies bend.

SUMMARY OF THE INVENTION

The present invention provides a pendulum valve that substantially eliminates or reduces disadvantages and problems associated with previously developed pendulum valves. More specifically, embodiments of the present invention provide a pendulum valve with a full range of normal position control. One embodiment of the pendulum valve can include a valve housing with a flow channel that allows the flow of a fluid (e.g., between a vacuum chamber to a turbo pump). The pendulum valve includes a valve body that is movable within the valve housing from a fully open position, which can allow the free flow of fluid, to at least one closed position which prevents fluid from flowing through the pendulum valve. In operation, the valve body can move within the valve housing generally perpendicular to the flow path from the fully open position to a partially open position that is generally axially aligned with the flow channel of the fluid. Furthermore, the valve body can move normal to the flow channel to any partially opened normal position and to at least one fully closed position. The pendulum valve can include a linear control mechanism that is operable to move the valve body normally to the flow channel and position the valve body in any one of a range of partially open positions.

In another embodiment of the present invention, the pendulum valve can include a valve housing with a flow channel and a valve body that is movable within the housing between a fully open position and a closed position. The valve body can also include a valve frame that is rotatable about a primary axis and a valve plate that is mounted to the valve frame such that the valve plate can rotate about a second axis of rotation. The second axis of rotation for the valve plate can lie in a plane that is generally orthogonal to the flow channel. Because the valve plate can rotate, the valve plate can self-align to form a seal with the valve housing even if the valve frame has become partially deformed.

Embodiments of the present invention provide an important technical advantage with respect to previous pendulum valves by allowing the valve body to be positioned throughout a range of continuous partially-opened positions, thereby providing for more accurate throttling of fluids in systems using the pendulum valve.

Embodiments of the present invention provide another important technical advantage by combining sealing and pressure control functions into a single pendulum valve.

Embodiments of the present invention provide yet another important technical advantage by significantly reducing the size and complexity of pendulum valves.

Embodiments of the present invention provide yet another important technical advantage by being significantly easier to maintain, thereby reducing down time for manufacturing equipment when the pendulum valve of the present invention must be serviced or maintained.

Embodiments of the present invention provide yet another important technical advantage by providing a self-aligning valve body which can form a seal even when the valve body has become bent or misshapen.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein.

DETAILED DESCRIPTION OF THE INVENTION

Preferred embodiments of the present invention are illustrated in the FIGUREs, like numerals being used to refer to like and corresponding parts of various drawings.

Pendulum valves are commonly used in semiconductor manufacturing equipment to control chamber pressure. They can be located, for example, between high-vacuum chambers (e.g., on the order of one torr or less) and turbo pumps. A pressure sensor can monitor the gas pressure within a vacuum chamber or other apparatus and can communicate the pressure to a pressure controller, which can compare the detected pressure to a set point. A difference between the detected pressure and the set point can cause the pressure controller to generate an electrical signal to open or close the pendulum valve, thereby controlling chamber pressure.

Embodiments of the present invention provide a valve with a full range of normal position control. Because the valve body can be positioned in any one of a plurality of partially open positions, the pressure controller can accurately throttle fluid flow through the pendulum valve.

Figure 1:
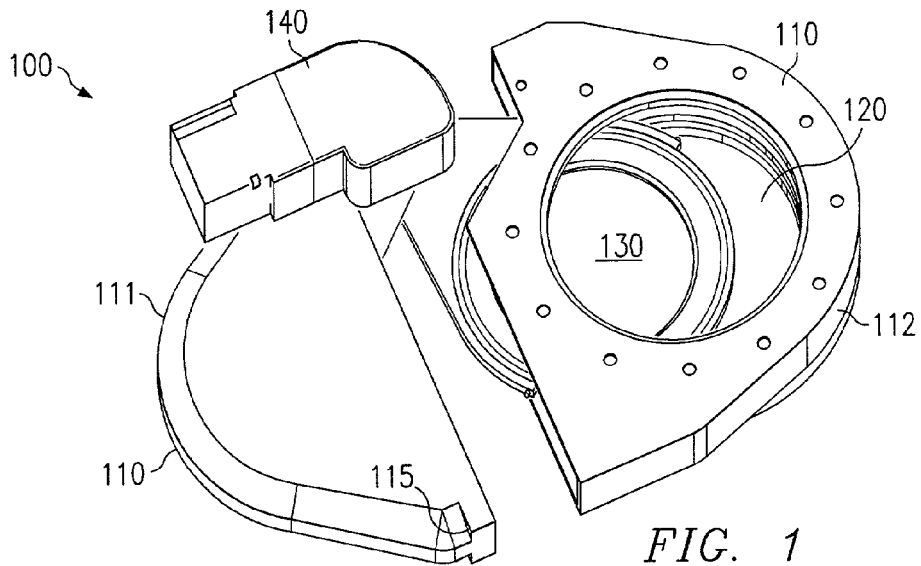
FIG. 1 illustrates one embodiment of a pendulum valve according to the present invention.

FIG. 1 illustrates one embodiment of pendulum valve 100 according to the present invention. Pendulum valve 100 can be mounted between various components of semiconductor manufacturing equipment (e.g., a turbo pump and a vacuum chamber). However, it should be noted that while embodiments of the present invention are discussed primarily in terms of semiconductor applications, embodiments of pendulum valve 100 according to the present invention can be mounted in any number of fluid flow channels. Additionally, it should be understood that embodiments of pendulum valve 100 according to the present invention can be used to regulate liquid and/or gas flow (i.e., fluid flow). Pendulum valve 100 can include a valve housing 110 that can comprise several parts that are removably coupled together. For example, in FIG. 1, the valve housing 110 can comprise two parts (e.g., first housing portion 111 and second housing portion 112) that are attached together by, for example, screws or bolts (e.g., bolt 115). As will be discussed below, a multipart housing can provide ease of service and maintenance. Valve housing 110 can have a flow channel 120 to allow for the flow of fluids through pendulum valve 100 and a valve body 130 that can move within valve housing 110 from a fully open position to a fully closed position. Valve body 130 can rotate within valve housing 110 from the fully open position to a position that is generally axially aligned with flow channel 120. In the embodiment shown in FIG. 1, valve body 130 can rotate from second housing portion 112 into first housing portion 111 to achieve the fully open position and can rotate into second housing portion 112 to achieve approximate axial alignment with flow channel 120. A drive mechanism 140, such as a step motor, can control the rotation of valve body 130 between the fully open position and the position generally axially aligned with flow channel 120. It should be understood, however, that while the valve body is described primarily in terms of rotating within the valve housing, the valve body could move in other manners generally perpendicular to the flow channel.

Pendulum valve 100 can also include a linear control mechanism, discussed in greater detail in conjunction with later figures, that can move valve body 130 normal to flow channel 120. The linear control mechanism can normally position the valve body in a continuous range of partially open positions and in a closed position. Thus, valve body 130 can be rotated into axial alignment with flow channel 120 and can be moved normal to the flow channel 120 to seal flow channel 120, or, as will be discussed below, valve body 130 can be rotated into axial alignment with flow channel 120 and be positioned in any one of a plurality of continuous partially open positions (e.g., the valve body can be positioned in a continuous range of positions between the position generally axially aligned with the flow channel and the closed position) to throttle the flow of fluid through flow channel 120.

In one embodiment of the present invention, drive mechanism 140, valve body 130, and the linear control mechanism can be coupled to first housing portion 111. When pendulum valve 100 requires maintenance or cleaning, first housing portion 111, drive mechanism 140, valve body 130 and the linear control mechanism can be separated from the second housing portion 112, which could remain in place between the vacuum chamber and turbo pump. Because drive mechanism 140, valve body 130 and the linear control mechanism can be removed with first housing portion 111, pendulum valve 100 of this embodiment of the present invention can be easily maintained. Furthermore, a new first housing portion 111, drive mechanism 140, and valve body 130 can be easily switched out while the previous components are being repaired, thus significantly reducing down time when pendulum valve 100 fails.

Figure 2:
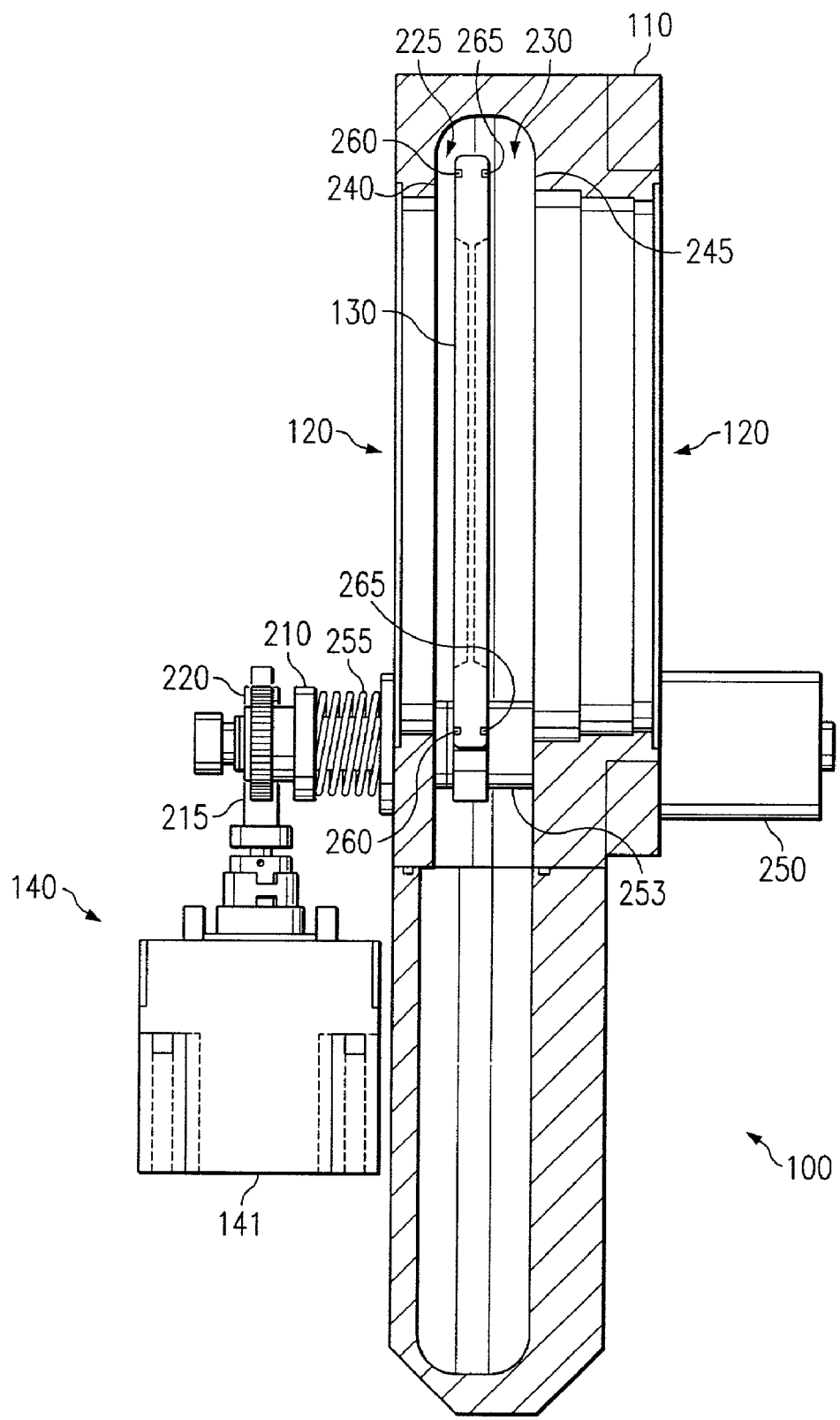
FIG. 2 illustrates a cut-away side view of the pendulum valve of FIG. 1.

FIG. 2 illustrates a cut-away side view of one embodiment of pendulum valve 100. Again, pendulum valve 100 can include a valve housing 110 defining a flow channel 120 to permit the flow of fluids (e.g., liquids and/or gases) through pendulum valve 100. A valve body 130 can rotate within the valve housing 110 from a fully open position to a position approximately axially aligned with flow channel 120 (e.g., the position shown in FIG. 2). When valve body 130 is in this position, fluid can still flow through flow channel 120 by flowing in the spaces between valve body 130 and valve housing 110 (e.g., through first gap 225 and second gap 230).

Rotation of valve body 130 can be controlled by drive mechanism 140, which, in one embodiment of the present invention, can include a step motor 141 that can rotate drive shaft 210 through worm gear 215 and gear 220. Valve body 130 can also be moved linearly (e.g., normal to flow channel 120) to a plurality of partially open positions. The normal movement of the valve body 130 can be controlled by a linear control mechanism 250 which can exert a linear force on the valve body (e.g., via thrust shaft 253) approximately normal to flow channel 120. The linear control mechanism can be operable to position valve body 130 over a continuous range of normal positions within valve housing 110 (e.g. over a continuous range of normal positions between the position generally axially aligned with the flow channel and at least one closed position). In other words, the linear control mechanism can position valve body 130 to narrow first gap 225 or second gap 230, thereby restricting flow through flow channel 120. Additionally, when valve body 130 is moved to engage first housing surface 240 or second housing surface 245, pendulum valve 100 will be sealed to prevent the flow of fluid (e.g., vapor) through flow channel 120. Thus, the linear control mechanism of the present invention can position the valve body 130 at a range of partially open (e.g. continuous) positions between first housing surface 240 and second housing surface 245 and can engage valve body 130 with first housing surface 240 or with second housing surface 245, providing accurate throttling and sealing of fluid flow through flow channel 120.

In one embodiment of the present invention, the linear control mechanism 250 can be solenoid 250. Solenoid 250 can exert a force on valve body 130 through thrust shaft 253. The force exerted by solenoid 250 can be opposed by a force exerted by spring 255 on valve body 130. In the configuration shown in FIG. 2, when current is applied to the solenoid, the solenoid can push thrust shaft 253 and, accordingly, valve body 130 towards first housing surface 240, while spring 255 can provide an opposing force to the solenoid. Depending on the amount of current applied to solenoid 250 and the spring constant of spring 255, valve body 130 can be positioned in a range of continuous positions between second housing surface 245 and first housing surface 240 (e.g., in a range of partially open positions). Thus, for example, if more current is applied to solenoid 250, valve body 130 can be moved closer to first housing surface 240. However, when spring 255 is compressed far enough, solenoid 250 will not be able to move valve body 130 any further for the particular current being applied, and, thus, valve body 130 will stop at a particular position normal to flow channel 120. By balancing the force applied by solenoid 250 and the force applied by spring 255, valve body 130 can be positioned at any partially open position (e.g., still allowing some fluid flow) between first housing 240 and second housing 245. If enough current is applied to solenoid 250, valve body 130 can engage valve housing surface 240 to create a seal and prevent the flow of fluid through flow channel 120. Spring 255 can also be configured such that if there is a power outage and no current is applied to solenoid 250, spring 255 can move valve body 130 to a position engaged with valve housing surface 245, thus sealing pendulum valve 100.

As previously noted, embodiments of pendulum valve 100 according to the present invention can be placed between a vacuum chamber and a turbo pump. The turbo pump side and chamber side are shown in FIG. 2 for the sake of illustration. In one embodiment of the present invention, if the vacuum chamber needs to be serviced, solenoid 250 can move valve body 130 to engage valve housing surface 240 and create a seal. If, on the other hand, the turbo pump needs to be serviced, current to solenoid 250 can be switched off and spring 255 can push the valve body to engage valve housing surface 245, thereby sealing pendulum valve 100. If a vacuum exists in the vacuum chamber, the atmospheric pressure on the pump side of pendulum valve 100 can further push valve body 130 against valve housing surface 245 to enhance the sealing between valve body 130 and valve housing surface 245. Thus, valve body 130 can be moved to multiple closed positions.

To further enhance sealing, either between valve body 130 and valve housing surface 240, or valve body 130 and valve housing surface 245, valve body 130 can have generally annular grooves 260 and 265 on opposing sides of valve body 130. An O-ring can be placed at least partially within each groove such that when valve body 130 engages first surface 240 or second surface 245, the respective O-ring creates a seal between valve body 130 and the engaged surface.

Figure 3:
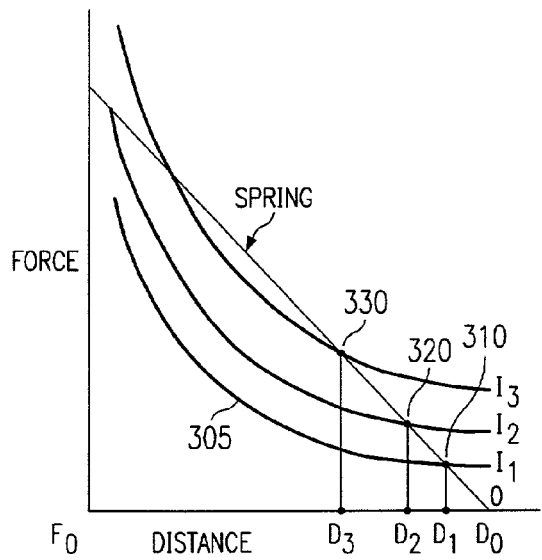
FIG. 3 is a graph illustrating the balancing of a solenoid force and spring force for one embodiment of a pendulum valve according to the present invention.

FIG. 3 is a graph illustrating the balancing of the forces applied by solenoid 250 and spring 255 on valve body 130 of the FIG. 2 embodiment. The normal positioning of valve body 130 can be accurately controlled by balancing the force applied by solenoid 250 with the spring force of spring 255. As shown in FIG. 3, in one embodiment of the present invention, when the current level to solenoid 250 is zero, valve body 160 can stay at position $D_0$ with a spring compression force of or near zero (i.e., as zero force is applied by solenoid 250, valve body 130 applies zero force against spring 255 and does not move any distance). $D_0$ could, for example, correspond to valve body 130 engaging second housing surface 245 (e.g., the pump side of pendulum valve 100). If the current to solenoid 250 is increased to $I_1$, the force of the solenoid can increase along the lowest curve (curve 305). As spring 255 is compressed and the spring force increases, a balance between the force applied by solenoid 250 and the force applied by spring 255 can be reached at point 310, which could correspond to a normal position of $D_1$ (e.g., valve body 130 could be slightly removed from valve housing surface 245, thereby creating a partially open flow channel 120). Similarly, increasing the current from $I_1$ to $I_2$ to $I_3$, the normal position of valve body 130 can move from $D_1$ to $D_2$ to $D_3$, respectively. Thus, by controlling the current applied to solenoid 250, valve body 130 can be precisely and accurately positioned at any position normal to flow channel 120.

It should be noted that the relationships between the spring constants and the current applied to solenoid 250 are exemplary only, and embodiments of the present invention could be calibrated depending on the particular solenoid 250 and spring 255 used. Additionally, while FIGS. 2 and 3 discuss the present invention with respect to the use of a mechanical spring, other devices for providing a force opposed to that provided by linear control mechanism (e.g., solenoid 250) can be used. Furthermore, while FIG. 3 shows three current levels being applied to solenoid 250, a continuous range of current levels can be applied to solenoid 250 resulting in a continuous range of normal positions for valve body 130.

Figure 4:
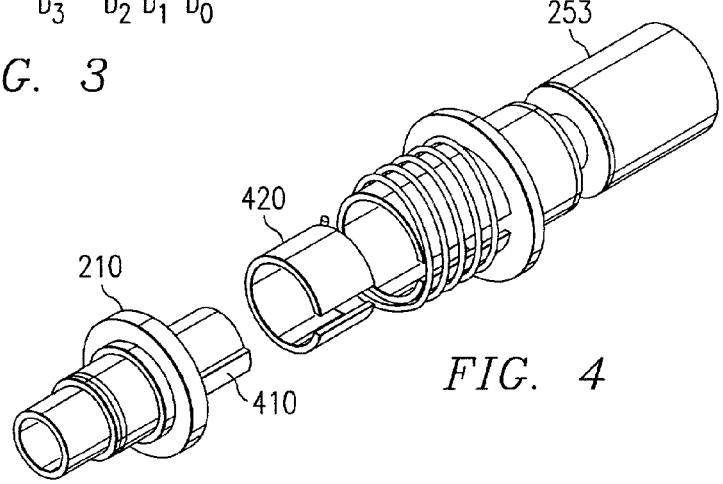
FIG. 4 provides an exploded view of one embodiment of a shaft for providing rotation and linear motion to a valve body.

As will be recalled, valve body 130 can move both axially and linearly within valve housing 130. FIG. 4 provides an exploded illustration of an embodiment of a shaft for providing rotation and linear motion to valve body 130. As noted in conjunction with FIG. 2, drive shaft 210 can be engaged with a worm gear 215 to transfer the motion of a driving mechanism (e.g., a step motor) to drive shaft 210. The rotation of drive shaft 210 can be transferred through a key 410 to a thrust shaft 253. A bushing 420 can allow the thrust shaft 253 to slide smoothly on key section 410, thus allowing for independent rotation and linear motion.

Figure 5:
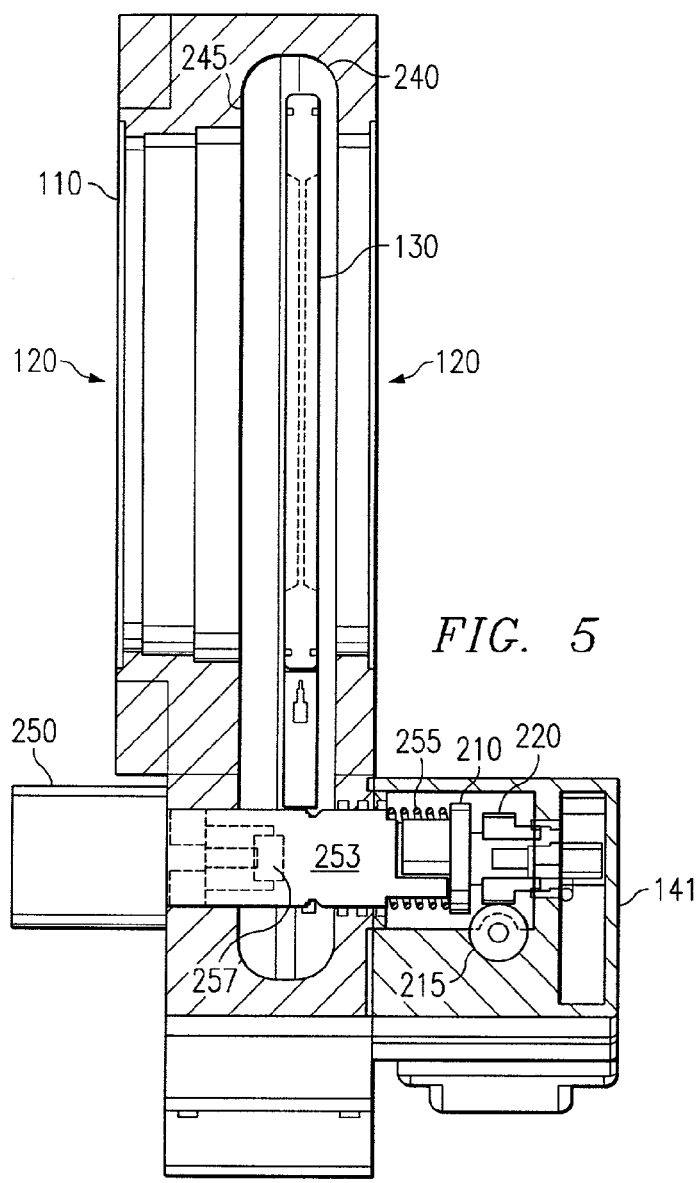
FIG. 5 illustrates a second embodiment of a pendulum valve according to the present invention.

FIG. 5 illustrates another embodiment of pendulum valve 100 according to the present invention. Pendulum valve 100 can again include valve housing 110 with a flow channel 120 to allow the flow of fluids therethrough. Pendulum valve 100 can also include a valve body 130 which can move within valve housing 110 from a fully open position to at least one closed position. Movement of valve body 130 within valve housing 110 can include both rotational movement between the fully open position and at least one position approximately axially aligned with flow channel 120 and movement normal to flow channel 120.

Rotation of valve body 130 can be controlled by a drive mechanism 140, which can include an electrical step motor 141. A worm gear 215 engaged with gear 220, which is further coupled to drive shaft 210, can transfer power from step motor 141 to drive shaft 210. Drive shaft 210 can rotate valve body 130 from the fully open position to a position that is generally axially aligned with flow channel 120.

Movement of valve body 130 normal to flow channel 120 can be controlled by linear control mechanism 250, which, in one embodiment of the present invention, can comprise a linear actuator. The linear actuator 250 can transfer linear motion to valve body 130 through thrust shaft 253, which can be engaged with drive shaft 210 (e.g., in the manner described in conjunction with FIG. 4). Additionally, thrust shaft 253 can rotate about thrust bearing 557, such that the linear motion and axial motion of valve body 130 are independent. As with previous embodiments of pendulum valves according to the present invention, pendulum valve 100 can include a spring 255 to oppose the force applied to valve body 130 by linear control mechanism 250. In this embodiment of the present invention, linear actuator 250 can apply a force to valve body 130, thus causing valve body 130 to move towards first housing surface 240 and causing compression of spring 255. When linear actuator 250 moves in the opposite direction, the force applied by spring 255 can overcome any friction that may prevent thrust shaft 210 from moving, thus causing valve body 130 to move towards second housing surface 245.

As with the solenoid, linear actuator 250 can position valve body 130 in any number of continuous partially open positions (e.g., positions which allow some fluid flow through flow channel 120). Current linear actuators can accurately position valve body 130 in positions on the order of micro inches apart, although as more precise linear actuators are developed, they could easily be implemented with embodiments of the present invention. Additionally, linear actuator 250 could position valve body 130 to engage with first housing surface 240 so that no fluid could pass through flow channel 120, or linear actuator 250 could position valve body 130 to be engaged with second housing surface 245, again so that no fluid could flow through flow channel 120. The sealing of pendulum valve 100 could be enhanced when valve body 130 is engaged with either surface 240 or surface 245 by an O-ring at least partially located in first annular groove 260 or second annular groove 265, respectively.

As can be noted from both FIG. 5 and FIG. 2, the majority of components for the embodiments of pendulum valve 100 shown can be coupled together in one portion of valve housing 110 (e.g., first housing portion 111). Thus, in an embodiment of the present invention in which the valve housing includes several parts that can be removably coupled together, all the major components, such as the linear control mechanism 250 (e.g., solenoid 250 or linear actuator 250), the drive shaft, the valve body, and the drive mechanism (e.g., the step motor) can be removed with one portion of the valve housing 110, making such an embodiment of pendulum valve 100 of the present invention extremely easy to service and maintain. In case of a valve failure, the linear controller, drive shaft, valve body and drive mechanism can be switched out with a new first housing portion 111, within a few minutes, thereby reducing down-time. Additionally, because embodiments of pendulum valves according to the present invention do not require secondary control valves or pneumatics, they can be substantially easier to manufacture.

Figure 6:
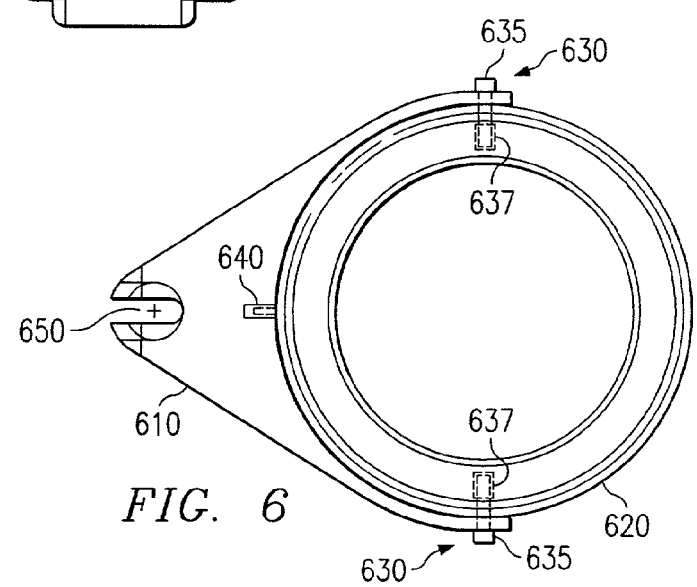
FIG. 6 illustrates one embodiment of a valve body for a pendulum valve according to the present invention.

FIG. 6 illustrates one embodiment of a valve body 130 for an embodiment of pendulum valve 100 according to the present invention. The embodiment of the valve body illustrated in FIG. 6 can include a two-piece architecture having a valve frame 610 and a valve plate 620. Valve frame 610 can be attached or coupled to valve plate 620 via rotatable mounting 630, which, in one embodiment of the present invention, can include a pair of bolts 635 threaded through valve frame 610 and inserted into recess holes 637 in valve plate 620. Valve plate 620 can then rotate relative to valve frame 610 about the rotatable mounting. However, it would be understood that many other rotatable mountings can be used so long as valve plate 620 can rotate relative to valve frame 610. Additionally, while FIG. 6 shows that the rotatable mounting defines an axis of rotation for the valve plate which is at the centerline of the valve plate, the axis of rotation could, in fact, be off-center. A dowel pin 640 can also be included with valve plate 620 to prevent large rotations of valve plate 620.

In operation, valve frame 610 can rotate about a primary axis 650, which, as can be recalled from FIGS. 2 and 5, can be defined by a drive shaft. Valve frame 610 can rotate valve plate 620 from a fully open position to a position that is approximately axially aligned with flow channel 120 of pendulum valve 100. The valve frame, and hence the valve plate, can also move normal to the flow channel (e.g., into and out of FIG. 6). If one portion of valve plate 620 contacts valve housing 110 before another portion when valve plate 620 is moved to engage the surface of valve housing 110, a turning moment relative to a second rotation axis (e.g., the axis defined by the rotatable mounting and lying in a plane generally orthogonal to the flow channel) will be exerted on a valve plate 620 causing valve plate 620 to self-align and seal the flow channel. Thus, even if valve frame 610 is damaged or misshapen due to the pressure differential between the turbo pump and the vacuum chamber, valve plate 620 can self-align in flow channel 120 to seal pendulum valve 100. When valve plate 620 is moved away from the surface of the housing, dowel pin 640 can prevent large rotations of valve plate 620.

Embodiments of the present invention provide a pendulum valve with a full range of normal position control, thus allowing for effective throttling of the flow channel. Because embodiments of the present invention can employ linear control mechanisms which can position the valve body in a plurality of partially open positions normal to the flow channel and in at least one closed position, control and sealing functions can be combined in a single valve. Furthermore, the lack of pneumatics decreases the size and complexity of pendulum valves according to the present invention, making them easier to manufacture and maintain. Additionally, embodiments of the present invention can include a two-piece valve body which can self-align in the flow channel to reduce leak rate and to form a better seal even if the valve frame has become bent.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A valve with a full range of position control comprising:
   a valve housing defining a flow channel;
   a valve body movable within the valve housing from a fully open position to a position approximately axially aligned with the flow channel; and
   a linear control mechanism operable to move the valve body along the flow channel in approximately a straight line from a first fully closed position to a second fully closed position and position the valve body along the flow channel in the first fully closed position, the second fully closed position and any partially opened position between the first fully closed position and the second fully closed position.

2. The valve of claim 1, wherein the valve body is rotatable about a primary axis of rotation approximately parallel to a direction of movement of the valve body along the flow channel to move from the fully open position to the position approximately axially aligned with the flow channel and wherein the linear control mechanism imparts a force at approximately the primary axis of rotation to move the valve body along the flow channel.

3. The valve of claim 1, further wherein the valve body further comprises:
   a valve frame;
   a valve plate mounted to the valve frame, wherein the valve plate is rotatable about an axis of rotation lying in a plane generally orthogonal to the flow channel.

4. The valve of claim 3, wherein the valve plate is mounted to the valve frame at approximately the centerline for the valve plate with a rotatable coupling.

5. The valve of claim 1, wherein the valve body comprises:
   a valve plate comprising:
      a first side;
      a second side obverse to the first side; and
   wherein, when the valve body is in the first fully closed position the first side of the valve plate seals with the valve housing to close the flow channel and when the valve body is in the second fully closed position, the second side of the valve plate seals with the valve housing to close the flow channel.

6. The valve of claim 1, wherein the first fully closed position is an inlet-side position and the second fully-closed position is an outlet-side position.

7. The valve of claim 1, wherein the linear control mechanism further comprises a solenoid contacting a thrust shaft and wherein the solenoid imparts a force to the valve body via the thrust shaft.

8. The valve of claim 1, wherein the linear control mechanism further comprises a linear actuator contacting a thrust shaft and wherein the linear actuator imparts a force to the valve body via the thrust shaft.

9. The valve of claim 1, wherein the valve housing further comprises:
   a first housing portion; and
   a second housing portion defining the flow channel removably coupled to the first housing portion; and
   wherein the linear control mechanism is mounted to the first housing portion.

10. A pendulum valve comprising:
    a valve housing defining a flow channel; and
    a valve body movable about a primary axis of rotation between a fully opened position and a position generally axially aligned with the flow channel;
    a linear control mechanism to impart a force to the valve body at approximately the primary axis of rotation to move the valve body along the flow channel in a from a first fully closed position to a second fully-closed position and to any partially opened position between a first fully closed position and a second fully closed position, the valve body further comprising
    a valve frame;
    a valve plate mounted to the valve frame having a first side and a second side obverse from the first side; and
    wherein the valve plate is rotatable about an axis of rotation lying in a plane generally orthogonal to the flow channel and wherein the first side of the valve plate seals with the valve housing in the first fully closed position and the second side seals with the valve housing in the second fully closed position.

11. The pendulum valve of claim 10, wherein the valve body further comprises a rotatable coupling mounting the valve plate to the valve frame at approximately a centerline of the valve plate.

12. The pendulum valve of claim 10, wherein the valve plate further comprises:
    a first annular groove one the first side of the valve plate;
    a first o-ring at least partially located in the first annular groove;
    a second annular groove on the second side of the valve plate;
    a second o-ring at least partially located in the second annular groove;
    wherein when the valve body is in the first fully closed position the first o-ring contacts the valve housing to form a seal; and
    wherein when the valve body is in the second fully closed position the second o-ring contacts the valve housing to form a seal.

13. A pendulum valve with a full range of normal position control comprising:
    a valve housing further comprising:
       a first housing portion; and
       a second housing portion defining a flow channel removably coupled to the first housing portion;
    a valve body movable within the valve housing from a fully opened position to a position generally axially aligned with the flow channel;
    a thrust shaft connected to the valve body;
    a drive shaft at least partially mounted within the first housing portion defining a primary axis of rotation operable to rotate the thrust shaft to move the valve body generally perpendicular to the flow channel to the position approximately axially aligned with the flow channel;
    a drive mechanism mounted to the first housing portion operable to rotate the drive shaft; and a linear control mechanism mounted to the first housing portion operable to move the thrust shaft to move the valve body along the flow channel from a first fully closed position to a second fully closed position and position the valve body in the first fully closed position, the second fully closed position and any partially opened position between the first fully closed position and the second fully closed position.

14. The pendulum valve of claim 13, wherein the flow channel has an inlet inline with an outlet.

15. The pendulum valve of claim 14, wherein the valve body further comprises:
- a valve frame;
- a valve plate mounted to the valve frame by a rotatable coupling, wherein the valve plate rotates about an axis of rotation lying in a plane generally orthogonal to the flow channel to self-seal in the first fully closed position and the second fully closed position.

16. A pendulum valve with a full range of position control comprising:
- a valve housing defining a flow channel having a first housing portion and a second housing portion;
- a valve body movable in the valve housing;
- a thrust shaft at least partially located in the first housing portion; and
- a linear control mechanism mounted to the first housing portion operable to move a thrust shaft to move the valve body along the flow channel in approximately a straight line from a first fully closed position to a second fully closed position and position the valve body in any partially opened position between the first fully closed position and the second fully closed position.

17. The pendulum valve of claim 16, wherein the flow channel has an inlet inline with an outlet.

18. The pendulum valve of claim 16, wherein the valve body further comprises:
- a valve frame;
- a valve plate mounted to the valve frame by a rotatable coupling, wherein the valve plate rotates about an axis of rotation lying in a plane generally orthogonal to the flow channel to self-seal in the first fully closed position and the second fully closed position.

19. A pendulum valve comprising:
- a valve housing defining a flow channel; and
- a valve body movable about a primary axis of rotation between a fully opened position and a position generally axially aligned with the flow channel;
- a linear control mechanism to impart a force at approximately the primary axis of rotation to move the valve body along the flow channel to a first fully closed position, a second fully closed position, a plurality of partially opened positions between the first fully closed position and the second fully closed position, wherein the primary axis of rotation is approximately parallel to a direction of movement of the valve body along the flow channel, the valve body further comprising
- a valve frame;
- a valve plate mounted to the valve frame; and
- wherein the valve plate is rotatable about an axis of rotation lying in a plane generally orthogonal to the flow channel.

20. The pendulum valve of claim 19, wherein the valve body further comprises a rotatable coupling mounting the valve plate to the valve frame at approximately a centerline of the valve plate.

21. The pendulum valve of claim 20, wherein the valve plate further comprises:
- a first annular groove;
- a first o-ring at least partially located in the first annular groove;
- a second annular groove on the obverse side of the valve plate from the first annular groove;
- a second o-ring at least partially located in the second annular groove;
- wherein when the valve body is in the first fully closed position the first o-ring contacts the valve housing to form a seal; and
- wherein when the valve body is in the second fully closed position the second o-ring contacts the valve housing to form a seal.

* * * * *